United States Patent [19]

Badono et al.

[11] Patent Number: 4,785,409

[45] Date of Patent: Nov. 15, 1988

[54] SYSTEM FOR REDUCING NOISE IN A SCREEN DISPLAY

[75] Inventors: Shinji Badono; Toshimasa Tomoda, both of Amagasaki, Japan

[73] Assignee: Mitsubishi Denki Kabushiki Kaisha, Japan

[21] Appl. No.: 823,278

[22] Filed: Jan. 28, 1986

[30] Foreign Application Priority Data

Jan. 29, 1985 [JP] Japan ................................. 60-16255

[51] Int. Cl.[4] .......................... H04N 5/21; G09G 3/00
[52] U.S. Cl. ..................................... 364/518; 358/166; 358/167; 358/280; 358/111; 382/54; 340/728
[58] Field of Search ................... 358/166, 80, 206, 89, 358/167, 280, 111; 382/54; 340/728, 700, 347 AD; 364/518

[56] References Cited

U.S. PATENT DOCUMENTS

| 3,872,246 | 3/1975 | Schneider | 358/167 |
|---|---|---|---|
| 3,984,865 | 10/1976 | Avins | 358/167 |
| 3,997,774 | 12/1976 | Schlaepfer | 358/167 |
| 4,058,836 | 11/1977 | Drewery et al. | 358/167 |
| 4,367,490 | 1/1983 | Riederer | 358/167 |
| 4,392,123 | 7/1983 | Brüggeman | 340/347 AD |
| 4,405,920 | 9/1983 | Weisstein | 340/700 |
| 4,458,267 | 7/1984 | Dolazza | 358/111 |
| 4,463,375 | 7/1984 | Macovski | 358/111 |
| 4,488,245 | 12/1984 | Dalke et al. | 364/526 |
| 4,521,774 | 6/1985 | Murphy | 340/745 |
| 4,521,808 | 6/1985 | Ong et al. | 358/111 |
| 4,571,635 | 2/1986 | Mahmoodi et al. | 358/284 |
| 4,573,035 | 2/1986 | Dolazza | 340/347 AD |
| 4,593,316 | 6/1986 | Kellar et al. | 358/140 |
| 4,613,905 | 9/1986 | Ichinoi | 358/167 |
| 4,631,598 | 12/1986 | Burkhardt et al. | 358/280 |
| 4,638,456 | 1/1987 | Elias et al. | 364/518 |
| 4,639,784 | 1/1987 | Fling | 358/167 |
| 4,688,095 | 8/1987 | Beg et al. | 358/160 |
| 4,707,786 | 11/1987 | Dehner | 364/414 |

OTHER PUBLICATIONS

"Digital Integration", Sklensky and Buchanan, pp. 317, 319, 320.

"Real-Time Radiologic Imaging", Kruger et al., pp. 304–306.

Primary Examiner—Gary V. Harkcom
Assistant Examiner—Randy W. Lacasse
Attorney, Agent, or Firm—Leydig, Voit & Mayer

[57] ABSTRACT

A loop is constructed in which an output of a two-dimensional integrator is fed back through an exponential function unit for each pixel of a picture signal, a difference between the output and an input picture signal of the corresponding pixel of a next frame is taken and the difference is input to the corresponding element of the two-dimensional integrator, whereby relative standard deviations of quantum noise of an output picture are made constant at all positions of a screen.

9 Claims, 3 Drawing Sheets (a) PRIOR ART (b) PRIOR ART (c)

SYSTEM FOR IN REDUCING NOISE IN A SCREEN DISPLAY

BACKGROUND OF THE INVENTION

This invention relates to a picture processor which is used especially in industrial or medical X-ray television and which processes a digitized picture signal to improve a picture.

In industrial or medical X-ray television, a prior-art picture processor for reducing the statistical noise of a radiation picture has been as shown in FIG. 4. In the figure, numeral 10 designates a picture memory consisting of M×N picture elements or pixels, and numeral 30 designates an adder.

In the picture processor thus constructed, a digitized input picture signal $I_i(X_m, Y_n)$ at a time $t_i$ and the value $C_{i-1}(X_m, Y_n)$ of the picture memory (two-dimensional memory) 10 at time $t_{i-1}$ are added by the adder 30, whereupon the sum is sent to the picture memory 10 and becomes the value $C_i(X_m, Y_n)$ thereof at the time $t_i$. $(X_m, Y_n)$ indicates the position of the picture element. The above calculation is performed for the respective pixels in succession, and the adding operations for all of the M×N pixels and the updating operations of the picture memory 10 are executed during the period of time $\Delta t = t_i - t_{i-1}$. $\Delta t$ is usually 60 ms which is the television rate. The content of the picture memory 10 is output as a processed picture signal.

Next, the operation of the prior-art picture processor will be described more in detail. The picture signal intrinsically includes quantum noise based on statistical properties in the course of the imaging process thereof. Therefore, when the signal intensity is low, the quantum noise is greatly influential and degrades the contrast, the resolution, etc. In case of a still picture, accordingly, a process is performed in which the picture signals are digitized and the digital data items are integrated for each pixel so as to reduce the influence of the quantum noise. In FIG. 4, the value $C_i(X_m, Y_n)$ of the picture memory 10 at the time $t_i$ is obviously the integration $$\sum_{j=1}^{i} I_j(X_m, Y_n)$$

of the picture signals $I_j(X_m, Y_n)$ input till then. Accordingly, in the processed picture which has been generated by reading out the content of the picture memory 10, the relative statistical error ascribable to the quantum noise is improved $\sqrt{N}$ times where N denotes the number of times of the adding operations.

The input and output signals of the picture processor corresponding to on line are respectively shown in FIGS. 5(a) and 5(b). The outpt signals become N times the input signals as to the respective pixels, and have their statistical errors improved $\sqrt{N}$ times. However, although the case of general shading characteristics is illustrated in the figures, the signal intensity on a picture differs depending upon places, so that even after the processing, the magnitudes of the statistical errors differ depending upon pixels and are not uniform in the entire frame. In the illustrated case, therefore, it can occur that the statistical error of a peripheral part is greater than the statistical error of a middle part, and that even when illustrated signals $S_1$ and $S_2$ superposed on the convex signal are equal in the intensity (contrast) relative to the convex signal, the middle signal $S_1$ is discriminated, whereas the peripheral signal $S_2$ is not discriminated. Even in a case where the statistical quantum noise in the surroundings is lowered owing to a satisfactory integration, so the signal $S_2$ can also be discriminated, man is sometimes unable to simultaneously discern the signals $S_1$ and $S_2$ with the naked eye when the integrated picture is displayed on a monitor screen. This is attributed to the facts that the dynamic range of the visual system of man is narrow and that the difference of luminosities is too great between the bright part and dark part of the integrated picture.

Since the prior-art picture processor is constructed as described above, the effect of reducing the quantum noise of an integrated picture differs for each pixel, and even a signal having the same contrast can be discriminated or not, depending upon the intensity of a peripheral signal. Another disadvantage is that when the integrated picture is displayed on a monitor screen, the luminosity difference between the bright part and dark part of the picture is great, so even a signal discriminated from quantum noise cannot be discerned by the vision of man whose dynamic range is limited.

SUMMARY OF THE INVENTION

This invention has been made in order to eliminate the disadvantages of the prior-art device as described above, and has for its object to provide a picture processor according to which an integrated and processed picture has quantum noise of the same relative level over all the pixels thereof, and when this picture is displayed on a monitor screen, the range of bright parts in an input picture can be widened, and a small signal can be discerned with the naked eye.

A picture processor according to this invention comprises a two-dimensional integrator which integrates picture signals for respective pixels in succession, an exponential function unit which subjects an output of the two-dimensional integrator to exponential transform, and a subtractor which takes a difference between the output of the exponential function unit and an input picture signal for each corresponding pixel, an output of the subracter being input to the corresponding element of the two-dimensional integrator.

DESCRIPTION OF THE PREFERRED EMBODIMENTS

Figure 1:
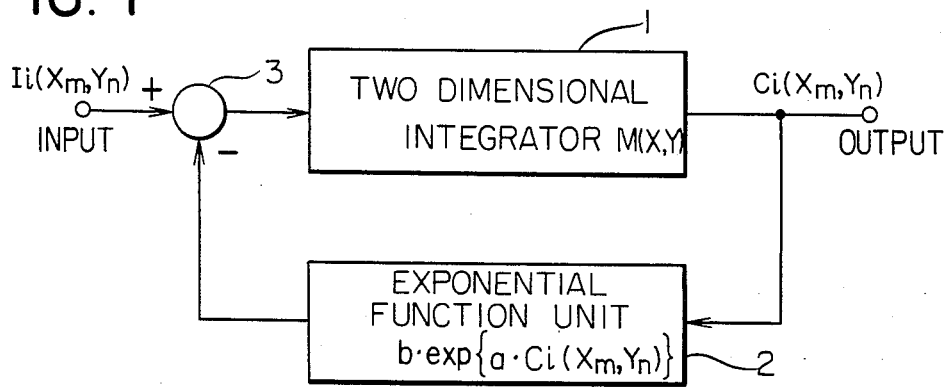
FIG. 1 is a block diagram showing a picture processor according to an embodiment of the present invention.

Now, an embodiment of this invention will be described with reference to the drawings. In FIG. 1, numeral 1 designates a two-dimensional integrator which has (M×N) elements, and numeral 2 an exponential function unit whose input is the output signal $C_i$ ($X_m$, $Y_n$) of the two-dimensional integrator 1. A subtractor 3 receives as its plus input a digitized input picture signal $I_i$($X_m$, $Y_n$), such input picture signals being fed in time series, and also receives as its minus input a transformed signal b·exp{a·Ci(Xm, Yn)} being the exponential function unit output of the two-dimensional integrator output signal $C_i$ ($X_m$, $Y_n$) corresponding to the pixel ($X_m$, $Y_n$) of the input picture signal, and it executes the subtraction between both the inputs. A processed signal output by this subtracter is input to the two-dimensional integrator 1 and is applied to the corresponding element thereof. Thus, a loop is formed. One frame consists of (M×N) picture elements or pixels, and the processing of all the pixels corresponding to one cycle is executed in the television rate of 30 ms. When a case of M=N=512 is considered, the 1-cycle processing needs to be executed within 30 ms/(512×512)≈115 ns per pixel. Since the access time of a static RAM is within 40 ns, this processing rate is sufficiently possible in such a way that a table of exponential functions is previously written in the memory as the exponential function unit 2, whereupon the table is referred to and an output is provided in accordance with an input.

Next, the operation of the embodiment will be described.

It is assumed that, as the input pictures, images of the same domain with high quantum noise (for example, radiation images) be fed in succession. When a certain number of frames have been input to reach a saturation, $$Ii(Xm, Yn) \approx b \cdot \exp\{a \cdot Ci(Xm, Yn)\} \quad (1)$$

holds, the $C_i$($X_m$, $Y_n$) becomes a nearly constant value C ($X_m$, $Y_n$). Therefore, the input/output characteristic of this system is derived from Eq. (1) as follows:

$$C(X_m, Y_n) = \frac{1}{a} \ln\{I(X_m, Y_n)/b\} \quad (2)$$

which is a logarithmic characteristic.

Figure 2:
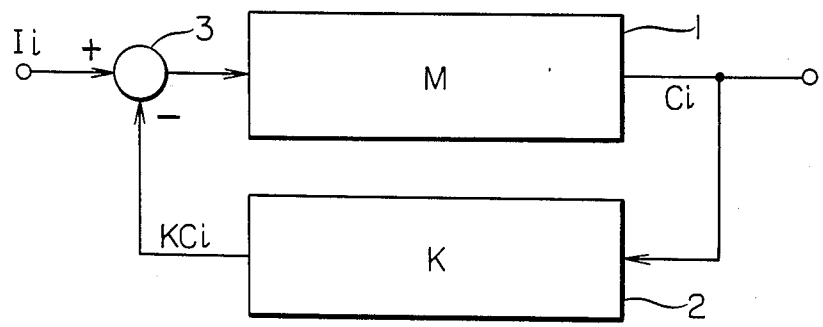
FIG. 2 is a block diagram for explaining a first-order lag integration device.

In order to find an equivalent time constant concerning the integration of this system, an integration device in FIG. 2 will be considered. In FIG. 2, a loop is formed in such a way that a value obtained by multiplying an integrator output C by K is fed back and that a value obtained by subracting K·C from an input I becomes an integrator input. This system has the well-known characteristic of first-order lag, and the time constant τ(the Greek letter "tau") thereof is given by 1/K. When inputs $I_i$ normally distributed around a certain mean value I are considered, the relative standard deviation σ of the output C is given by:

$$\sigma = 1/\sqrt{2I\tau}$$

Therefore, $$\sigma = \sqrt{\frac{K}{2I}}$$

holds. In the system according to the embodiment shown in FIG. 1, the value corresponding to the above coefficient K depends upon the value of the output of the two-dimensional integrator and is not constant, but when the images of the same domain are successively input as described above, an equivalent integration time constant of first-order lag can be considered at the time of the saturation. In this case, as the value corresponding to K in FIG. 2, $$K = \frac{\text{(variation of output of exponential function unit)}}{\text{(variation of input of exponential function unit)}}$$

may be given.

In this case, the above becomes:

$$K = \frac{d[b \cdot \exp\{a \cdot C(X_m, Y_n)\}]}{d[C(X_m, Y_n)]}$$
$$= a \cdot b \cdot \exp\{a \cdot C(X_m, Y_n)\}$$
$$= a \cdot I(X_m, Y_n)$$

and the integration time constant becomes:

$$\tau = \frac{1}{K} = \frac{1}{a \cdot I(X_m, Y_n)} \quad (3)$$

Since, as in the case of FIG. 2, the input picture signals may be considered as being normally distributed around the mean value I ($X_m$, $Y_n$), the relative standard deviation σ of the integrator 1 becomes:

$$\sigma = \frac{1}{\sqrt{2I(X_m, Y_n)\tau}} = \sqrt{\frac{a}{2}} \quad (4)$$

which is a fixed value irrespective of the signal level of the input. That is, the relative standard deviations of the quantum noise of the output picture become constant for all the positions of the domain.

In a case where the input picture signal is digitized with 8 bits, the depth of the picture memory is set at 16 bits, whereby b=1 and a=ln 256/65536=8.5×10⁻⁵ can be established. Therefore, the following $$\sigma = \sqrt{\frac{a}{2}} = 0.0065$$

Figure 3:
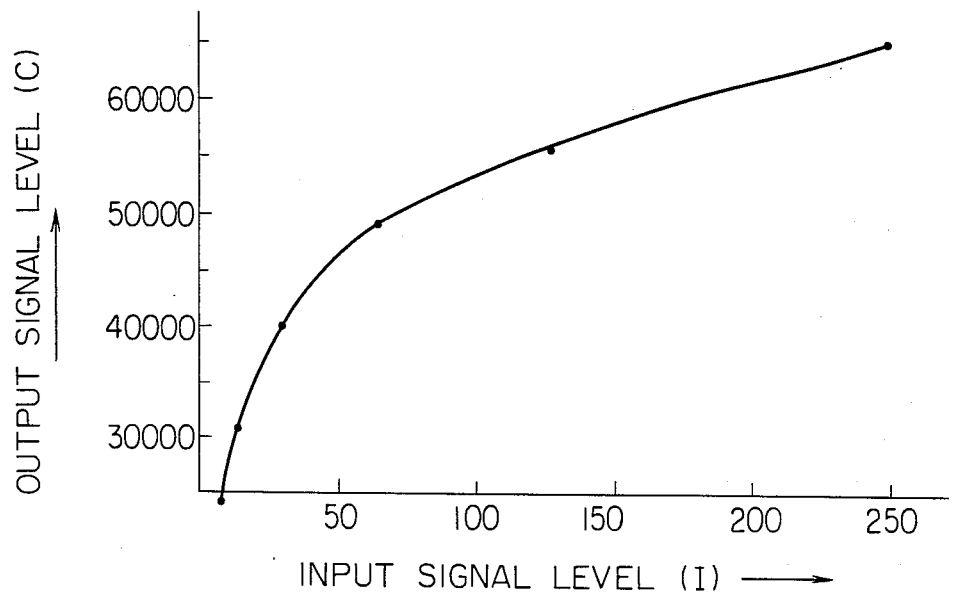
FIG. 3 is a graph showing the input/output characteristic of a picture processor according to an embodiment of the present invention.

That is, the standard deviation of the output picture can be rendered 0.65%. The input/output characteristic at this time is shown in FIG. 3. The input/output characteristic of the exponential function unit 2 on this occasion may be so set that the input and output in FIG. 3 are replaced with each other.

Figure 5:
FIGS. 5(a), 5(b) and 5(c) show an input picture, an output picture according to the prior-art picture processor, and an output picture according to the picture processor of the embodiment of the present invention, in correspondence with one line respectively.
Figure 5:
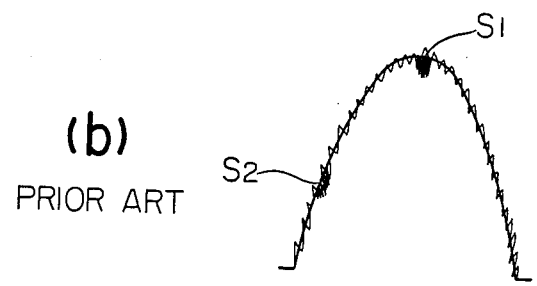
Figure 5:
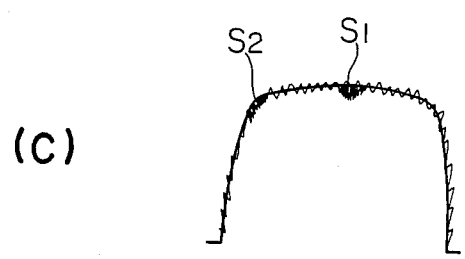

FIG. 5(c) shows one line of the output picture according to the present embodiment, for the comparison with that in the prior-art example.

Figure 6:
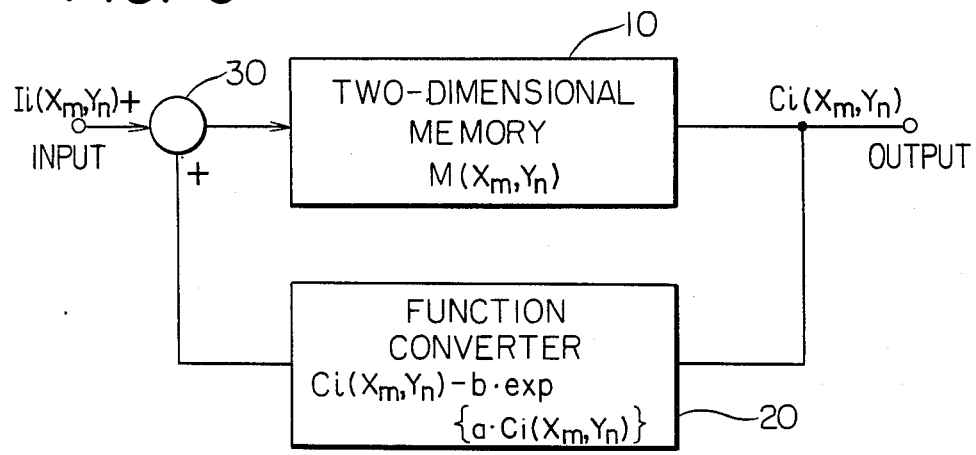
FIG. 6 is a block diagram showing a picture processor according to another embodiment of the present invention.

Next, a second embodiment of the present invention is shown in FIG. 6. Numeral 10 designates a two-dimensional memory which has (M×N) elements, and numeral 20 a function converter whose input is the output signal $C_i(X_m, Y_n)$ of the two-dimensional memory 10. An adder 30 receives as its plug input a digitized input picture signal $I_i(X_m, Y_n)$, such input picture signals being fed in time series, and also receives as its plus input a transformer signal $Ci(Xm, Yn)-b\cdot\exp\{a\cdot Ci(Xm, Yn)\}$ being the function converter output of the two-dimensional memory output signal $C_i(X_m, Y_n)$ corresponding to the pixel $(X_m, Y_n)$ of the input picture signal, and it adds both the inputs. A processed signal output by the adder is input to the two-dimensional memory 10 and is applied to the corresponding element thereof. Thus, a loop is formed.

One frame consists of $(M \times N)$ pixels, and the processing of all the pixels corresponding to one cycle is executed in the television rate of 30 ms. When a case of $M=N=512$ is considered, the 1-cycle processing needs to be executed within 30 ms/$(512 \times 512) \approx 115$ ns per pixel. This is sufficiently possible in such a way that a table of predetermined functions is previously written in a memory as the function converter 20, whereupon the table is referred to and an output is provided in accordance with an input.

Figure 4:
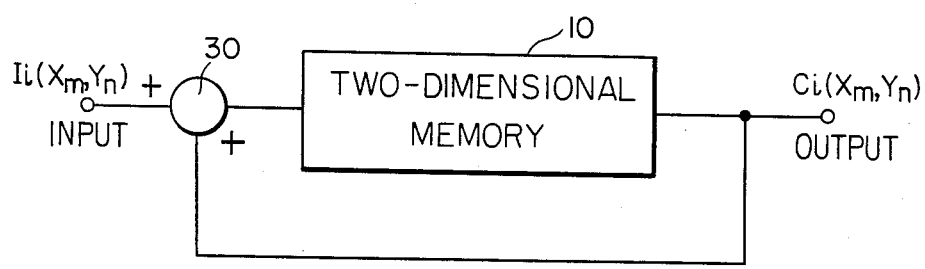
FIG. 4 is a block diagram showing a prior-art picture processor.
Figure 7:
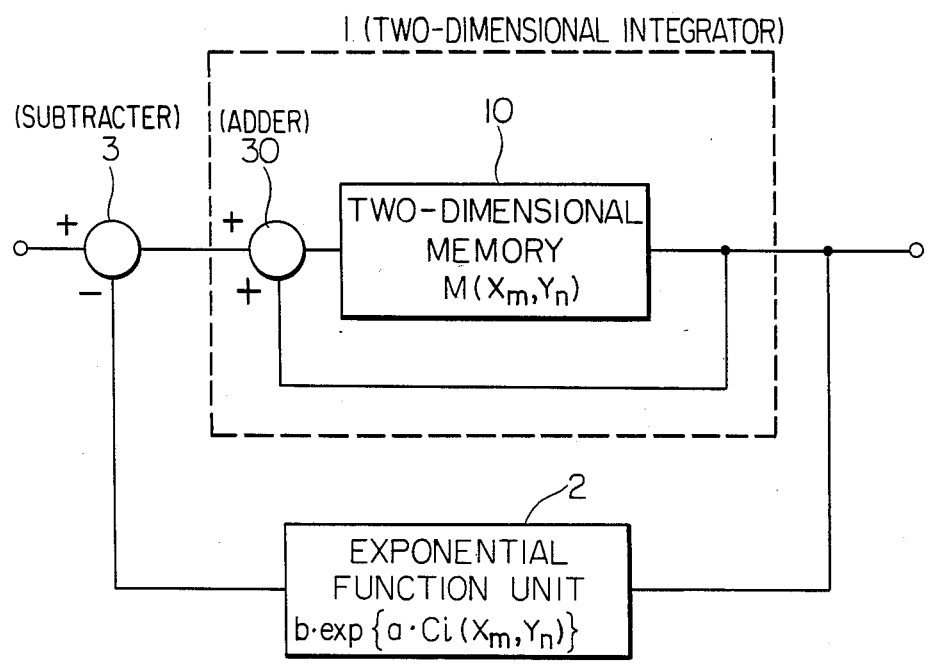
FIG. 7 is a block diagram showing the embodiment of the picture processor in FIG. 3.

In view of FIG. 1 showing the first embodiment and FIG. 4 showing the two-dimensional integrator in the prior art, the arrangement of the second embodiment becomes as shown in FIG. 7. This arrangement in FIG. 7 is simplified as illustrated in FIG. 6. Accordingly, the conversion formula f of the function converter 20 becomes as follows:

$$f = Ci(Xm, Yn) - b\cdot\exp\{a\cdot Ci(Xm, Yn)\}$$

In this manner, according to the device of the present embodiment, the output of the two-dimensional integrator 1 is exponentially converted so as to render the picture level change rate of superposed frames constant, the resulting output is subtracted from the input of the next frame, and the difference is input to the two-dimensional integrator 1. Therefore, in the addition of the bright parts of the picture, the quantity of the addition becomes saturated without increasing since a certain time, whereas the dark parts are further continued to be added until the quantity of the addition becomes saturated at the point of time at which the same statistical accuracy as that of the dark parts has been attained. Accordingly, a picture which has a constant noise contrast over the whole area is obtained, and the input pictures have the range of density differences compressed and can be extracted on a monitor screen.

While the foregoing embodiments have referred to the case where the digitized input picture signals are input at the television rate in time series, the input rate of the pictures may be of any value. In addition, while the number of pixels of one frame has been assumed $512 \times 512$ m it may be of any value. Further, while the embodiments have mentioned the example in which $b=1$ in Eq. (2) is held, a value corresponding to an input signal level can also be selected as b when the level is above a certain value.

As described above, according to this invention, a loop is so constructed that the output of a two-dimensional integrator is fed back through an exponential function unit and that the output of a subtracter whose inputs are an input picture signal and the output of the exponential function unit is applied as the input of the two-dimensional integrator, thereby to permit arithmetic processing for the respectively corresponding pixels. Alternatively, a loop is so constructed that the output of a two-dimensional memory is fed back through a function converter and that the output of an adder whose inputs are an input picture signal and the output of the function converter is input to the two-dimensional memory, thereby to permit arithmetic processing for the respectively corresponding pixels. This brings forth the effect that the standard deviation of noise in an output image becomes constant over the whole picture area irrespective of signal levels. Besides, the output becomes the logarithm of the input, small signals can be discerned in a wide range irrespective of the signal levels of the input pictures even when the output picture displayed on a monitor screen is seen with the naked eye of man having a narrow dynamic range.

What is claimed is:

1. A picture processor which processes digitized picture signals and displays a picture composed of an array of pixels produced by such signals on a monitor screen, said picture processor comprising a two-dimensional integrator which integrates digitized picture signals in succession and provides integrated signals corresponding to respective pixels, an exponential function unit which receives as inputs the integrated signals and produces output signals that are exponential functions of the integrated signals, and a subtractor which receives the output signals from said exponential function unit as a minus input and input picture signals as a plus input and which subtracts the output signals from the input picture signals for respectively corresponding pixels to produce a difference output which is input to said two-dimensional integrator, said integrated signals being output from said picture processor as integrated and processed picture signals, said integrated and processed picture signals having quantum noise of a constant relative level.

2. A picture processor according to claim 1 wherein said exponential function unit includes a memory storing an exponential transform table and determines the exponental functions of the integrated signals by referring to said table in accordance with the integrated signals.

3. A picture processor which processes digitized picture signals and displays a picture composed of an array of pixels produced by such signals on a monitor screen, said picture processor comprising a two-dimensional memory which stores digitized picture signals in succession and provides signals corresponding to respective pixels, a function converter which receives as inputs time series signals of stored outputs of said two-dimensional memory and substracts from the time series signals exponential transform values of the time series signals to produce output signals, and an adder which receives the output signals from said function converter as a first plus input and picture input signals as a second plus input and which adds the output signals and the picture input signals for respectively corresponding pixels to produce a sum output which is input to a corresponding element of said two-dimensional memory, said time series signals of stored outputs of said two-dimensional memory being output from said picture processor as processed picture signals, said processed picture signals having quantum noise of a constant relative level.

4. A picture processor according to claim 3 wherein said function converter includes a memory storing the transform values corresponding to respective input values on a conversion table as values which are obtained by subtracting from the input values exponential functions of the input values, and said function converter determines the numerical conversions by referring to the table in accordance with the input values.

5. A picture processor which processes digitized picture signals and displays a picture composed of an array of pixels produced by such signals on a monitor screen, said picture processor comprising:

receiving means for receiving digitized input picture signals;

two-dimensional means for holding digitized picture signals in succession and for providing signals corresponding to respective pixels, said signals corresponding to respective pixels having a constant relative quantum noise level;

transforming means for receiving the signals corresponding to respective pixels, for producing exponential transforms of the signals corresponding to respective pixels, and for outputting the exponential transforms as transformed signals;

combining means for combining the digitized picture input signals with the transformed signals to produce processed signals;

input means for inputting the processed signals to said two-dimensional means; and output means for outputting the signals corresponding to respective pixels to a video monitor screen.

6. A picture processor according to claim 5 wherein:

said two-dimensional means comprises a two-dimensional integrator;

said transforming means comprises an exponential function unit; and said combining means comprises a subtractor with a plus input connected to receive the digitized input picture signals from said receiving means and a minus input connected to receive the transformed signals from said exponential function unit.

7. A picture processor according to claim 5 wherein:

said two-dimensional means comprises a two-dimensional memory;

said transforming means comprises a function converter; and said combining means comprises an adder with a first plus input connected to receive the digitized input picture signals from said receiving means and a second plus input connected to receive the transformed signals from said function converter.

8. A picture processor according to claim 6 wherein said exponential function unit comprises a memory means containing a look-up table.

9. A picture processor according to claim 7 wherein said function converter comprises a memory means containing a look-up table.

* * * * *